Sept. 5, 1944.     L. W. FALK     2,357,509
POWER TRANSMISSION
Filed May 23, 1941     2 Sheets-Sheet 1

Louis W. Falk
INVENTOR.
BY
ATTORNEY.

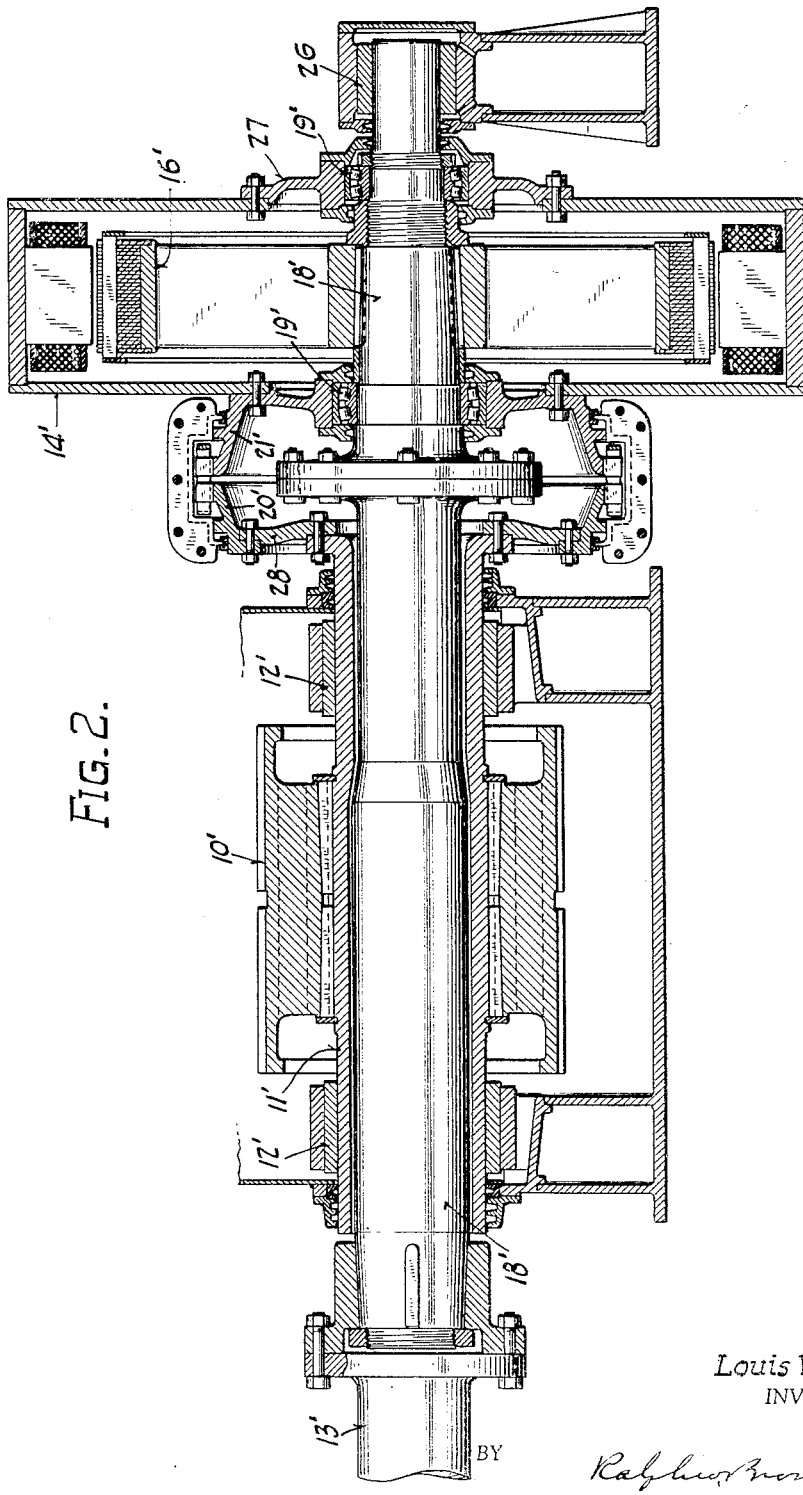

Patented Sept. 5, 1944

2,357,509

UNITED STATES PATENT OFFICE 2,357,509

POWER TRANSMISSION

Louis W. Falk, Milwaukee, Wis., assignor to The Falk Corporation, Milwaukee, Wis., a corporation of Wisconsin Application May 23, 1941, Serial No. 394,778

2 Claims. (Cl. 74—410)

This invention relates to power transmissions of a type commonly used in marine propulsion systems.

Such transmissions commonly involve a main gear connected to drive a propeller shaft and one or more pinions meshing therewith, each pinion being driven by an appropriate prime mover through a slip coupling of either hydraulic or electric type. The pinions and gear are ordinarily of the double helical or herringbone type and for efficient and quiet gear action it is important that each pinion be mounted and connected to the prime mover in such manner as to permit free axial movement of the pinion in order that it may properly adjust itself to the gear. At the same time it is highly important, particularly in the case of electric couplings, that the two parts of the coupling be accurately maintained in definite positional relation in order that the air gap between the armature and field members thereof be accurately maintained.

One object of the present invention is to provide, in a power transmission, a novel combination and arrangement of parts by which both of the above conditions may be fully realized.

Other more specific objects and advantages will appear, expressed or implied, from the following description of two illustrative embodiments of the present invention.

In the accompanying drawings:

Fig. 2 is a similar view of another embodiment of the invention.

Figure 1:
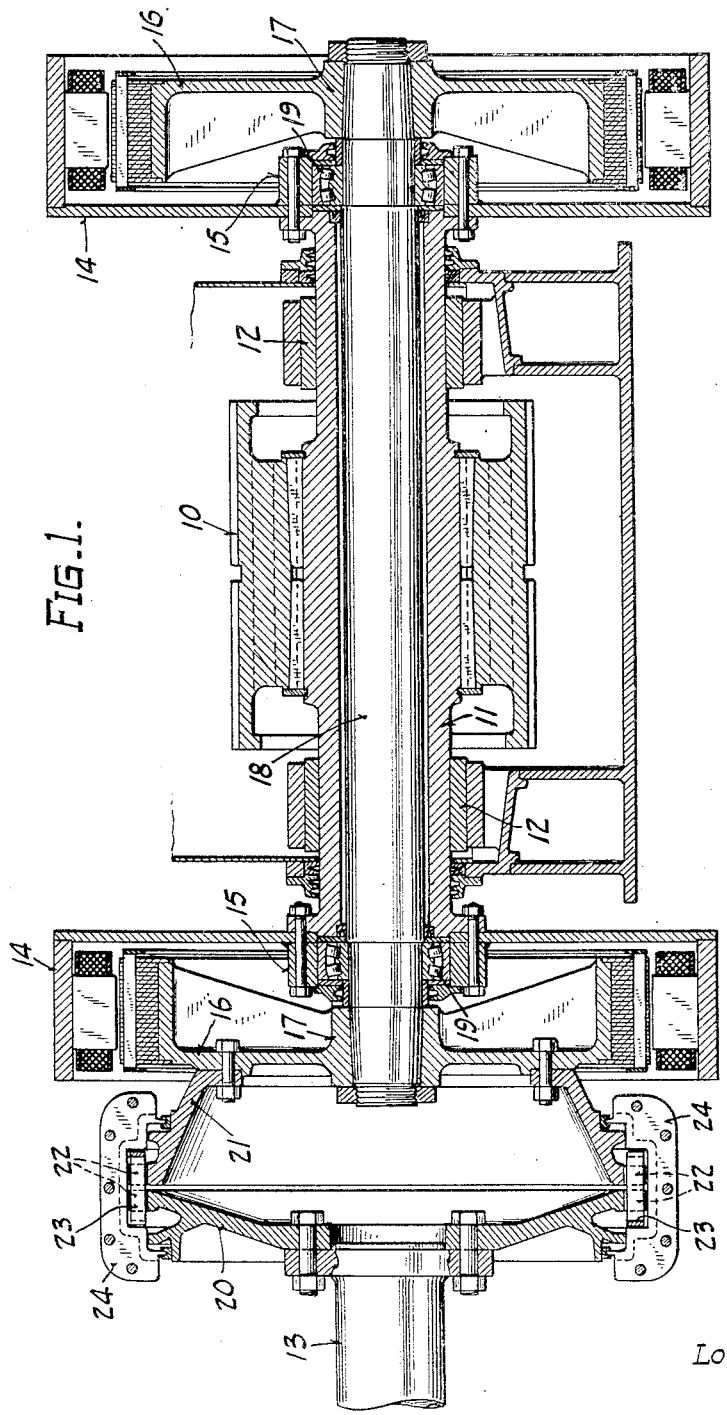
Figure 1 is a sectional view of a power transmission constructed in accordance with the present invention.

The power transmission shown in Fig. 1 comprises a herringbone pinion 10 keyed or otherwise fixed to a hollow supporting shaft 11 journalled at opposite ends in sleeve bearings 12 in which the shaft is free to move axially. The pinion 10 is arranged to mesh with and drive a herringbone gear (not shown) mounted in the usual manner.

In this instance, the pinion shaft 11 is driven from a drive shaft 13 through two electric couplings of a well known type disposed at the opposite ends thereof. Each coupling shown comprises an outer rotor 14 having a hub 15 bolted or otherwise fixed to one end of the pinion shaft, and a coacting inner rotor 16 having a hub 17 keyed or otherwise fixed to an end of a shaft 18 which extends loosely through the pinion shaft. The shaft 18 is journalled at opposite ends in bearings 19, preferably of the spherical or self-aligning type, seated in the hub 15 of the outer rotor. It will be noted that the bearings 19 positively maintain a definite positional relation between the inner and outer rotors of each coupling so that the narrow air gap therebetween is accurately preserved.

The shaft 18 is driven from the drive shaft 13 preferably through a flexible coupling which renders the shafts 18 and 11, electric couplings, and pinion 10 free to shift axially as a unit. The flexible coupling shown is of a type fully described in the patent to Kelley and Schmitter No. 2,137,964. It comprises a pair of heads 20 and 21 whose peripheries are slotted, as at 22, to receive a resilient gridlike connector 23 confined within a split housing 24 surrounding the heads. In this instance, one of the heads 20 is bolted or otherwise secured to the drive shaft 13 and the other head 21 is similarly attached to the inner rotor 16 of the adjacent electric coupling, the inner rotor of the other electric coupling being also connected to the coupling head 21 through the shaft 18.

It will thus be noted that the inner rotors 16 of both electric couplings are simultaneously driven from the head 21 of the flexible coupling with which they are rigidly connected, and that the pinion 10 is driven by the outer rotors 14 of both electric couplings with which it is rigidly connected. It will also be noted, however, that the head 21 of the flexible coupling is free to shift axially with respect to the other head 20 thereof, thereby providing axial freedom for the pinion 10 and connected parts. This is accomplished while insuring a definitely fixed positional relation between the inner and outer rotors of both coupling elements.

The transmission shown in Fig. 2 also includes a herringbone pinion 10' similarly fixed to a hollow pinion shaft 11' journalled at its ends in sleeve bearings 12' in which the shaft is free to move axially. In this instance the pinion shaft is driven from a drive shaft 13' through a single electric coupling carried by a connector shaft 18', the shaft 18' being supported at one end by a pedestal bearing 26, and at its other end by the drive shaft 13' to which it is bolted or otherwise secured.

The inner rotor 16' of the electric coupling is in this instance keyed or otherwise fixed to the shaft 18', and the outer rotor 14' is supported on bearings 19' carried by the shaft 18' at opposite sides of the inner rotor, so that both are rigidly maintained in fixed positional relation. One side of the outer rotor 14' is bolted or otherwise fixed to a carrier ring 27 mounted on one of the bearings 19', while the other side is bolted or otherwise fixed to one head 21' of a flexible coupling of the same type hereinabove mentioned, the head 21' being mounted on the other of the bearings 19'.

In this instance the flexible coupling shown provides a driving connection between the electric coupling and the pinion shaft 11', the other head 20' of the flexible coupling being bolted or otherwise fixed to a carrier ring 28 bolted or otherwise attached to the end of the pinion shaft. It will be noted that the pinion 10' and its shaft are mounted wholly independently of the drive shaft 13' and connected shaft 18' and that the pinion is free to shift axially in a manner to adjust itself to the herringbone gear with which it is engaged.

Various changes may be made in either embodiment of the invention hereinabove specifically described without departing from or sacrificing the advantages of the invention as defined in the appended claims.

I claim:

1. In a power transmission the combination of a driver, a pinion, a hollow shaft supporting said pinion, bearings for said hollow shaft disposed at opposite sides of said pinion, a torque transmitting shaft driven by said driver and extending through said hollow shaft, a slip type coupling having two coacting rotors, one of said rotors being fixed to said last named shaft, a bearing on said last named shaft for supporting the other of said rotors, and a radially and axially flexible coupling between said last mentioned rotor and said hollow shaft.

2. In a power transmission the combination of an axially movable pinion, a pinion shaft supporting the same, a slip type coupling mounted independently of said pinion shaft, said coupling comprising two coacting rotors, a driving element fixed to one of said rotors, a bearing on said driving element for supporting the other of said rotors, and a radially and axially flexible coupling for connecting said last mentioned rotor to said pinion shaft.

LOUIS W. FALK.